(12) United States Patent
Schmidt

(10) Patent No.: US 6,180,715 B1
(45) Date of Patent: Jan. 30, 2001

(54) AQUEOUS SOLUTION AND DISPERSION OF AN ACID SALT OF A POLYETHERAMINE

(75) Inventor: Dale C. Schmidt, Midland, MI (US)

(73) Assignee: The Dow Chemical Company, Midland, MI (US)

(*) Notice: Under 35 U.S.C. 154(b), the term of this patent shall be extended for 0 days.

(21) Appl. No.: 09/389,509

(22) Filed: Sep. 3, 1999

(51) Int. Cl.[7] .............................. C08J 3/00; C08K 3/20; C08L 69/00; C08L 71/12; B29D 22/00
(52) U.S. Cl. .......................... 524/611; 428/35.2; 524/612
(58) Field of Search .................................. 524/611, 612; 428/35.2

(56) References Cited

U.S. PATENT DOCUMENTS

| | | | |
|---|---|---|---|
| 5,275,853 | 1/1994 | Silvis et al. | 428/35.4 |
| 5,834,078 | 11/1998 | Cavitt et al. | 428/35.7 |
| 5,962,093 | * 10/1999 | White et al. | 428/35.2 |

* cited by examiner

Primary Examiner—Patrick D. Niland
(74) Attorney, Agent, or Firm—Reid S. Willis

(57) ABSTRACT

A solution and a stable aqueous dispersion of an acid salt of a polyetheramine can be prepared by at least partially neutralizing the polyetheranine with an acid. The solution and dispersion are useful as a coating, particularly in applications where it is desirable to have a barrier against small molecules.

17 Claims, No Drawings

AQUEOUS SOLUTION AND DISPERSION OF AN ACID SALT OF A POLYETHERAMINE

BACKGROUND OF THE INVENTION

In paper packaging applications, it is desirable to provide barriers against water, oxygen, and carbon dioxide. Wettability of a paper surface can be reduced using sizing agents, while gas barriers can be formed by coating the paper with a continuous film of a suitable material. Examples of such barrier-producing films are paraffin wax, polyethylene, ethylene-vinyl acetate copolymer, and poly(vinylidene chloride) (PVDC). Of these, PVDC has the best water-, vapor-, and oxygen-barrier properties. Moreover, unlike other high oxygen-barrier materials, PVDC is almost insensitive to water. However, because of its high chlorine content, PVDC tends to corrode processing equipment, which increases manufacturing costs.

It would be an advantage in the art to prepare a non-chlorine-containing, self-dispersing latex or solution that can be used to make a coating that is effective as a barrier against small molecules. It would be further advantageous if the barrier properties were not adversely affected by contact with water. It would be desirable if the coating adhered to a substrate without the aid of an ancillary adhesive. Finally, it would be desirable for some applications that this coating be biodegradable, so that the product can be composted subsequent to its intended use.

SUMMARY OF THE INVENTION

The present invention is a stable aqueous dispersion or solution of an acid salt of a polyetheramine having structural units represented by the formula:

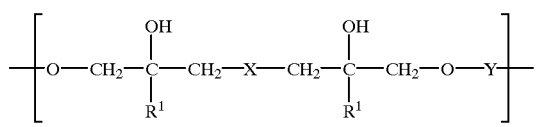

where $R^1$ is independently in each occurrence hydrogen or $C_1$–$C_{12}$ alkyl; Y is predominantly a hydrocarbylene moiety; and X is

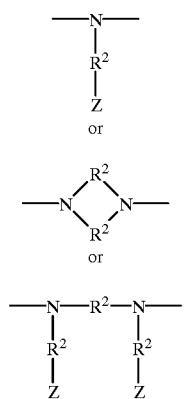

wherein $R^2$ is independently in each occurrence $C_2$–$C_{20}$ hydrocarbylene; Z is independently in each occurrence H, alkylamido, hydroxyl, alkoxy, alkylcarbonyl, aryloxy, arylcarbonyl, halo, or cyano.

In another aspect, the present invention is a method of preparing a stable aqueous dispersion or a solution of an acid salt of a polyetheramine comprising the step of contacting the polyetheramine with water and an acid under such conditions to form the stable aqueous dispersion or solution, where the polyetheramine has structural units represented by the following formula:

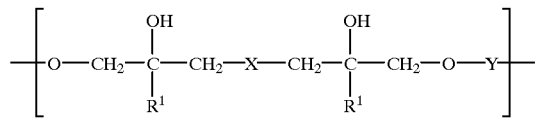

where $R^1$ is independently in each occurrence hydrogen or $C_1$–$C_{12}$ alkyl; where X is

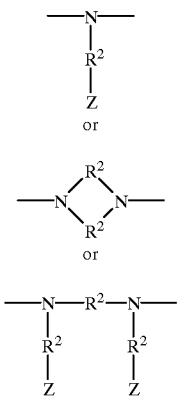

wherein $R^2$ is independently in each occurrence $C_2$–$C_{20}$ hydrocarbylene; Z is independently in each occurrence H, aLkylamido, hydroxyl, alkoxy, alkylcarbonyl, aryloxy, arylcarbonyl, halo, or cyano; and Y is predominantly a hydrocarbylene moiety.

The solution or stable dispersion of the acid salt of the polyetheramine can be easily applied to a wide variety of surfaces to impart a thinner and more uniform barrier than what is generally available from an extruded film. The coatings formed from the solution or dispersion tend to have enhanced physical properties due to the absence of an ancillary surfactant, which could interfere with the integrity of the coating.

DETAILED DESCRIPTION OF THE INVENTION

The acid salt of the polyetheramine can be prepared by contacting the polyetheramine represented by Formula I with an acid under such conditions to at least partially neutralize the polyetheramine. Referring now to Formula I, X is preferably

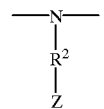

$R^1$ is preferably H or methyl; $R^2$ is preferably $C_2$–$C_6$ branched or linear alkyl, more preferably ethylene; and Z is preferably hydroxyl Y is preferably a divalent aromatic unit such as:

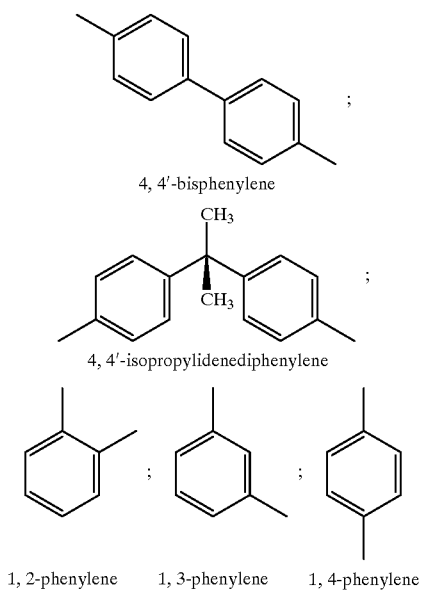

4, 4'-bisphenylene 4, 4'-isopropylidenediphenylene 1, 2-phenylene  1, 3-phenylene  1, 4-phenylene The polyetheramine represented by Formula I can be prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. Examples of diglycidyl ethers of dihydric phenols include the diglycidyl ethers of bishydroxyphenyl propanes, of 4,4'-dihydroxybiphenyl, of resorcinol, of catechol, and of hydroquinone, and combinations thereof. Preferred diglycidyl ethers of dihydric phenols are the diglycidyl ethers of resorcinol and of bisphenol A, and combinations thereof. The amine is preferably a monoalkanolamine, more preferably monoethanolamine. Many of these polyetheramines are described in U.S. Pat. No. 5,275,853. They can also be prepared by contacting a diglycidyl ether or an epihalohydrin with a difunctional amine.

Partial neutralization is preferred. Preferably, not less than about 20 percent, more preferably not less than about 30 percent, and most preferably not less than about 40 percent of the nitrogen atoms in the polyetheramine are protonated; preferably not more than about 80 percent, more preferably not more than about 70 percent, and most preferably not more than about 60 percent of the nitrogen atoms in the polyetheramine are protonated. Preferably, the polyetheramine is contacted with water and acid at a temperature not less than about 70° C., more preferably not less than about 90° C., and most preferably not less than about 110° C., and preferably not greater than about 200° C., and more preferably not greater than about 150° C. A high-pressure reactor such as a PARR reactor can be conveniently used to carry out the reaction, particularly under most preferred conditions.

The acid can be protic or aprotic, but is preferably protic. Examples of suitable protic acids include hydrochloric acid, hydrobromic acid, hydroiodic acid, hydrofluoric acid, sufuic acid, phosphoric acid, nitric acid, lactic acid, acetic acid, formic acid, propanoic acid, toluene sulfonic acid, carbonic acid, carbon dioxide, and citric acid.

It has been surprisingly discovered that a self-dispering stable aqueous dispersion, not merely an aqueous suspension, of the polyetheramine can be prepared under the conditions described herein. Consequently, a water based dispersion that is free of, or substantially free of any organic solvent or ancillary surfactant, can be applied to the surface of a substrate to form a barrier coating.

The aqueous dispersion or solution of the polyetheramine salt is useful as a coating for substrates such as wood, metal, ceramic, glass, other polymers, paper, paper board cloth, woven fibers, non-woven fiber mats, synthetic fibers, and carbon fibers. The aqueous dispersion or solution is also useful as a film, a foam, an adhesive, a laminate, a molded article, an extruded article, a flexible or rigid container, or a packaging material The following examples are for illustrative purposes only and are not intended to limit the scope of this invention.

EXAMPLES 1–5

Preparation of Solutions or Dispersions of a Polyetheramine Using a Digylcidyl Ether of bisphenol A A polyetheramine polymer is prepared by reacting a digylcidyl ether of bisphenol A (DERT™ 332 resin, a trademark of The Dow Chemical Company) with monoethanolamine at a mole:mole ratio of 1:1 as described in U.S. Pat. No. 5,275,853, column, 11, lines 29–40, which description is incorporated herein by reference.

Polymer pellets, water, and acid are added to a PARR vessel. The vessel is sealed and then heated with continuous mixing to the set temperature over a period of about 30 minutes. The temperature is maintained for another 30 minutes, and the reactor is then allowed to cool to about room temperature (which takes about 1 hour). Table 1 illustrates the set temperature, the acid type, melt index (MI) of the resin, weight percent polyetheramine (PEA, based on the weight of the water, acid, and polyetheramine), weight percentage of the acid (based on the weight of polyetheramine), pH, conductivity, percent solids (measured by a CEM LabWave 9000 microwave moisture/solids analyzer), and viscosity.

The concentrations of the acids used are as follows: 100% acetic acid, 85% by weight lactic acid, and 85% by weight phosphoric acid. Thus, if 3.5 g of lactic acid solution is —combined with 10.0 g of polyetheramine, this is considered a 30% (0.85 *35) lactic acid concentration.

TABLE 1

| examp. no. | Set Point ° C. | Acid | MI of PEA | wt. % PEA | wt. % acid | pH | cond. mS/cm | % sol. | vis cP |
|---|---|---|---|---|---|---|---|---|---|
| 1 | 130 | Lactic | 20 | 10 | 38 | 3 | 4.5 | 14.0 | 236 |
| 2 | 130 | Lactic | 5 | 10 | 64 | 3 | 4.5 | 16.8 | 262 |
| 3 | 130 | Acetic | 20 | 20 | 150 | 3 | 4.0 | 25.4 | 1380 |
| 4 | 130 | Acetic | 5 | 20 | 150 | 3 | 3.8 | 25.2 | 1880 |
| 5 | 125 | Phosph | 5 | 10 | 17 | 4 | 1.4 | 10.1 | 16 |

In examples 1–4, a clear orange solution is formed. In example 5, a white opaque dispersion is formed.

EXAMPLES 6–7

Preparation of Solutions or Dispersions of a Polyetheramine Using a 1:1 Mixture of a Digylcidyl Ether of bisphenol A and Resorcinol Digylcidyl Ether A polyetheramine is prepared by reacting the digylcidyl ether of bisphenol A (DER™ 332 resin, a trademark of The Dow Chemical Company) and resorcinol diglycidyl ether with monoethanolamine at a weight:weight:weight ratio of 41:41:18 under reaction conditions described in U.S. Pat. No. 5,275,853, column, 11, lines 29–40. The mole:mole ratio of total diglycidyl ether to monoethanol amine is approximately 1:1.

The dispersion of the acid salt of the polyetheramine is prepared following the procedure of Examples 1–5. Table 2 illustrates the set temperature, the acid type, weight percent polyetheramine (based on the weight of the water, acid, and polyetheramine), weight percentage of the acid (based on the weight of polyetheramine), pH, conductivity, percent solids (measured by a CEM LabWave 9000 microwave moisture/solids analyzer), and viscosity. For both examples 6 and 7, a white, opaque dispersion is formed.

TABLE 2

| examp. no. | Set Point ° C. | Acid | wt. % PEA | wt. % acid | pH | cond. mS/cm | % sol. | vis cP |
|---|---|---|---|---|---|---|---|---|
| 6 | 130 | Lactic | 20 | 10 | 5.5 | 3.5 | 22.2 | 120 |
| 7 | 125 | Phosph | 20 | 11 | 5 | 1.7 | 22.5 | 14 |

What is claimed is:

1. A composition comprising a stable aqueous dispersion of an acid salt of a polyetheramine having structural units represented by the formula:

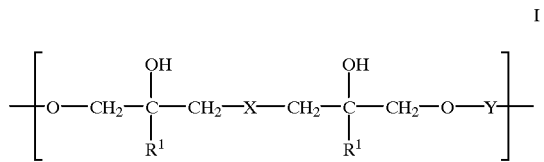

I where $R^1$ is independently in each occurrence hydrogen or $C_1$–$C_{12}$ alkyl; Y is a hydrocarbylene moiety and X is

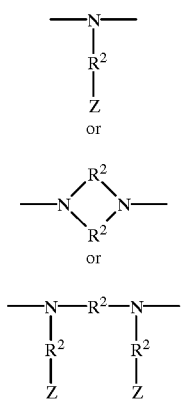

where $R^2$ is independently in each occurrence $C_2$–$C_{20}$ hydrocarbylene; Z is independently in each occurrence H, alkylamido, hydroxyl, alkoxy, alkylcarbonyl, aryloxy, arylcarbonyl, halo, or cyano.

2. The composition of claim 1 wherein X is

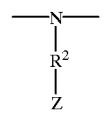

$R^1$ is H or methyl; $R^2$ is $C_2$–$C_6$ linear or branched alkylene, and Z is OH.

3. The composition of claim 2 wherein Y is 4,4'-bisphenylene, 4,4'-isopropylidenediphenylene, 1,2-phenylene, 1,3-phenylene, or 1,4-phenylene.

4. The composition of claim 3 wherein, Y is 4,4'-isopropylidenediphenylene or 1,3-phenylene, $R^1$ is H, and $R^2$ is ethylene.

5. The composition of claim 1 which is a protic acid salt of the polyetheramine.

6. The composition of claim 5 wherein the protic acid is hydrochloric acid, hydrobromic acid, hydroiodic acid, hydrofluoric acid, sulfuric acid, phosphoric acid, nitric acid, lactic acid, acetic acid, formic acid, propanoic acid, toluene sulfonic acid, carbonic acid, carbon dioxide, or citric acid, or a combination thereof.

7. The composition of claim 4 wherein the acid is lactic acid, phosphoric acid, or acetic acid or a combination thereof.

8. The composition of claim 5 which is substantially absent of an organic solvent.

9. The composition of claim 1 which is a coating, a film, a foam, an adhesive, a laminate, a molded article, an extruded article, a flexible or rigid container, or a packaging material.

10. A method of preparing a stable aqueous dispersion of an acid salt of a polyetheramine comprising the step of contacting the polyetheramine with water and an acid under pressure and at a temperature of not less than about 110° C. to not greater than about 200° C. to form the stable aqueous dispersion, where the polyetheramine has structural units represented by the following formula:

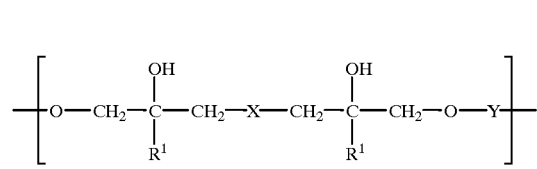

I where $R^1$ is independently in each occurrence hydrogen or $C_1$–$C_{12}$ alkyl; Y is a hydrocarbylene moiety; and X is

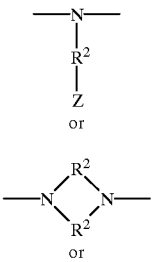

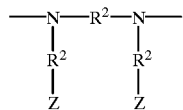

$R^2$ is independently in each occurrence $C_2$–$C_{20}$ hydrocarbylene; Z is independently in each occurrence H, alkylamido, hydroxyl, alkoxy, alkylcarbonyl, aryloxy, arylcarbonyl, halo, or cyano.

11. The method of claim 10 wherein X is

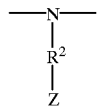

$R^1$ is H or methyl $R^2$ is $C_2$–$C_6$ linear or branched alkylene, and Z is OH.

12. The method of claim 11 wherein Y is 4,4'-bisphenylene, 4,4'-isopropylidenediphenylene, 1,2-phenylene, 1,3-phenylene, or 1,4-phenylene.

13. The method of claim 11 wherein Y is 4,4'-isopropyhdenediphenylene or 1,3-phenylene, $R^1$ is H, and $R^2$ is ethylene.

14. The method of claim 10 wherein the acid is hydrochloric acid, hydrobromic acid, hydroiodic acid, hydrofluoric acid, sulfuric acid, phosphoric acid, nitric acid, lactic acid, acetic acid, formic acid, propionic acid, toluene sulfonic acid, carbonic acid, carbon dioxide, or citric acid or a combination thereof.

15. The method of claim 13 wherein the acid is lactic acid, phosphoric acid, or acetic acid.

16. The method of claim 15 which is carried out at a temperature of not less than about 110° C. and not greater than about 150° C.

17. A composition comprising a stable aqueous dispersion of an acid salt of a polyetheramine having structural units represented by the formula:

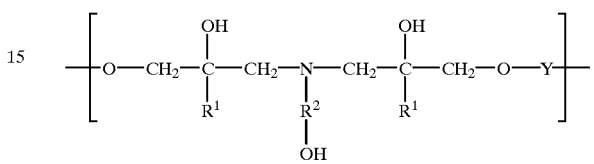

where $R^1$ is independently in each occurrence H or methyl; Y is 4,4'-bisphenylene, 4,4'-isopropylidenediphenylene, 1,2-phenylene, 1,3-phenylene, or 1,4-phenylene; and $R^2$ is independently in each occurrence $C_2$–$C_6$ linear or branched alkylene, wherein not less than 30 percent and not more than 70 percent of the nitrogen atoms in the polyetheramine are protonated.

* * * * *